(12) United States Patent
Beer

(10) Patent No.: US 8,172,563 B2
(45) Date of Patent: May 8, 2012

(54) PERFECT PIE CRUST CRIMPER

(75) Inventor: Janice Lee Beer, Spencer, MA (US)

(73) Assignee: Janice L. Beer, Spencer, MA (US)

(*) Notice: Subject to any disclaimer, the term of this patent is extended or adjusted under 35 U.S.C. 154(b) by 487 days.

(21) Appl. No.: 12/383,181

(22) Filed: Mar. 20, 2009

(65) Prior Publication Data

US 2010/0239702 A1    Sep. 23, 2010

(51) Int. Cl.
A47J 43/20     (2006.01)
A23P 1/00      (2006.01)

(52) U.S. Cl. .................................. 425/318

(58) Field of Classification Search ............ 425/318, 425/293, 396
See application file for complete search history.

(56) References Cited

U.S. PATENT DOCUMENTS 2,577,032 A * 12/1951 Paschis .............. 425/318
2,611,328 A *  9/1952 Roman ............... 425/318
2,619,053 A * 11/1952 Pakaluk et al. ....... 425/318

* cited by examiner

*Primary Examiner* — Maria Veronica Ewald

(57) ABSTRACT

A kitchen tool for use by anyone making a pie. The invention is a hand held tool which is in two pieces with each piece being held in each hand. When pushed together they aid the baker in creating a perfectly crimped pie crust edge.

1 Claim, 2 Drawing Sheets

PERFECT PIE CRUST CRIMPER

BACKGROUND OF INVENTION

This invention relates in helping anyone who wants to make and bake a pie crust with a perfectly crimped crust. Prior to this tool, the baker would use either a fork to press around the edge or try to use their fingers to pinch or press a finished edge. The prior techniques usually make a less desirable appearance on the finished pie. The technique of using ones fingers with the pie dough can be frustrating and almost impossible if someone had a manicure or their fingernails done. Many people will have their nails done around the holidays, which is a popular time for making pies. In addition to making the art of a beautiful pie crust much quicker and easier for any adult baker, even a child could take part in the experience of making a pie.

It is, therefore, a principle object of the invention to help any baker easily create a pie with a perfectly crimped edge.

BRIEF SUMMARY OF THE INVENTION

The invention consists of a hand held tool which is in two separate pieces of molded plastic. One piece is held in the left hand and the other piece is held in the right hand.

When in use, each piece is pushed toward the other while moving around the circumference of the pie's crust. Both pieces can be interchanged easily to accommodate whether someone is left handed or right handed. When the invention is used, it helps the user to avoid using their fingers and to also create an even edging.

In addition the invention will work on both a single or double crust pie.

DESCRIPTION OF THE PREFERRED EMBODIMENT

Figure 1:
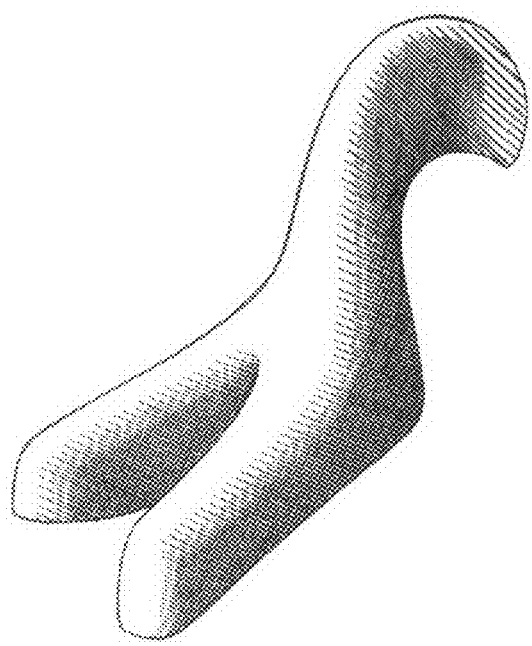
FIG. 1 is a perspective view showing one piece of the two piece crimping tool.
Figure 2:
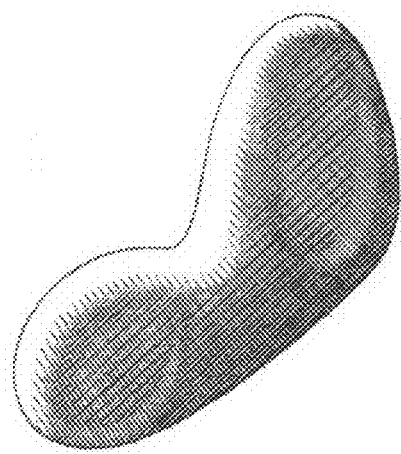
FIG. 2 is a perspective view of the second piece of the two piece crimping tool.
Figure 3:
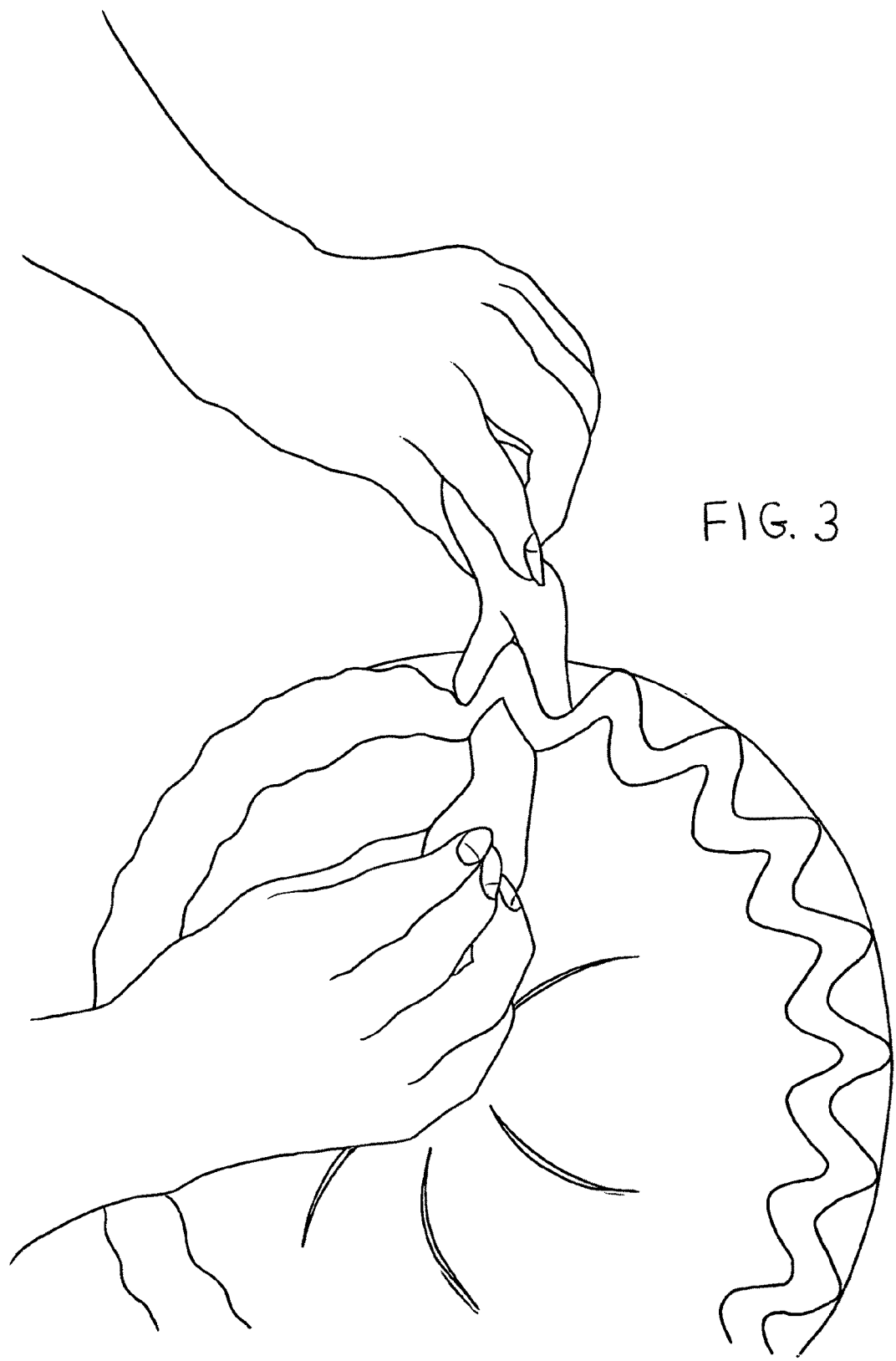
FIG. 3 is a top view of the crimping tool as it is being used. This view shows the outcome of what it is intended to do which is the perfect crimping of the pie crust.

The general features as shown in FIG. 1 of the crimping tool comprise of two separate pieces of molded plastic. The two pieces are designed to fit together when pushed towards each other. Small gripping handles are on the top of both pieces. This invention replaces the old method of using one's fingers or a fork to crimp the crust.

The invention claimed is:

1. A pie crimper, comprising: two separate pieces of molded plastic wherein one of the pieces has a single elongated body such that one peripheral edge of the body forms a straight line and the other opposite edge of the body forms two outwardly curved surfaces which converge to form a small valley, wherein one of the outwardly curved surfaces is larger than the other remaining outwardly curved surface and forms a handle and wherein the other remaining piece is comprised of two elongated bodies, which form a V-shape, and a longitudinally extending portion which extends in a vertical direction away from and perpendicular to the two elongated bodies and forms a hook-shaped tapered handle, such that the two separate pieces are held in each hand and when held, the single bodied piece fits into the V-shaped space of the double bodied piece and creates the crimped edge.

* * * * *